Patented Mar. 14, 1950

2,500,901

UNITED STATES PATENT OFFICE 2,500,901

2-ALLYL-6-SECONDARYBUTYLPHENYL ESTER OF BENZOIC ACID

Ezra Monroe, Midland, and Clare Hand, Sanford, Mich., assignors to The Dow Chemical Company, Midland, Mich., a corporation of Delaware No Drawing. Application April 13, 1949, Serial No. 87,373

1 Claim. (Cl. 260—476)

This invention is concerned with the 2-allyl-6-secondarybutylphenyl ester of benzoic acid having the formula:

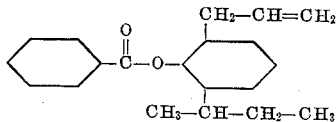

The new ester compound is an oily liquid somewhat soluble in many organic solvents and substantially insoluble in water. It is of value as a toxic constituent of parasiticidal compositions.

The new compound may be prepared by reacting benzoylchloride with an alkali metal salt of 2 - allyl-6-secondarybutylphenol. Substantially equimolecular proportions of the reactants have been found to give the ester product in good yield. In practice, the phenolate employed is preferably the sodium salt and may be prepared by reacting substantially equimolecular proportions of sodium hydroxide and the 2-allyl-6-secondarybutylphenol in water. The reaction between the phenolate and benzoylchloride is then conveniently accomplished by adding the latter portionwise to the above mixture with stirring and at a temperature of from 0° to 35° C. Following the reaction, the ester compound may be separated by conventional methods such as decantation and fractional distillation.

The 2-allyl-6-secondarybutylphenol employed as a starting material may be readily prepared by reacting together substantially equimolecular proportions of sodium hydroxide, allyl chloride, and 2-secondarybutylphenol in an organic solvent, such as acetone or ethanol. In such operations, the reactants are mixed together and heated for a period of time at the boiling temperature of the reaction mixture and under reflux. Upon completion of the reaction, the crude mixture is washed with water and fractionally distilled under reduced pressure to obtain 2-allyl-6-secondarybutylphenol.

In a representative preparation, 20 grams (0.5 mole) of sodium hydroxide and 95 grams (0.5 mole) of 2-allyl-6-secondarybutylphenol (boiling at 98° to 102° C. at 2 millimeters pressure) were dissolved in 191 milliliters of water. 71 grams (0.5 mole) of benzoylchloride was added portionwise over a period of 1½ hours to the above mixture. The addition was carried out at a temperature of from 4° to 9° C. Following the reaction, the crude reaction product was diluted with benzene, washed with water, and fractionally distilled under reduced pressure to obtain the 2-allyl-6-secondarybutylphenyl ester of benzoic acid as an oily liquid. The latter had a boiling point of 193° at 3.2 millimeters pressure and a refractive index $n/D$ of 1.5495 at 25° C.

To demonstrate the utility of this compound, a portion of the above product was dispersed in water to prepare a parasiticidal composition. The proportions of the constituents were 3 pounds of toxicant, 0.375 pound of the dioctyl ester of sodium sulfosuccinic acid (Aerosol OT), and 0.375 pound of refined kerosene per 100 gallons of spray composition. When employed for the control of two-spotted spider mite, such composition gave a control of 82 per cent.

We claim:

2-allyl-6-secondarybutylphenyl ester of benzoic acid.

EZRA MONROE.
CLARE HAND.

No references cited.